(12) United States Patent
Duesterhoeft

(10) Patent No.: US 8,113,890 B2
(45) Date of Patent: Feb. 14, 2012

(54) SOLAR MODULE CONNECTOR AND METHOD OF USE

(75) Inventor: Scott Stephen Duesterhoeft, Etters, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/773,069

(22) Filed: May 4, 2010

(65) Prior Publication Data

US 2011/0275232 A1 Nov. 10, 2011

(51) Int. Cl.
*H01R 13/11* (2006.01)
(52) U.S. Cl. ........................................ 439/855; 439/274
(58) Field of Classification Search .................. 439/274, 439/466, 468, 587, 731, 854, 855
See application file for complete search history.

(56) References Cited

U.S. PATENT DOCUMENTS

| | | | |
|---|---|---|---|
| 4,310,211 A * | 1/1982 | Bunnell et al. ................ | 439/358 |
| 4,460,232 A * | 7/1984 | Sotolongo ..................... | 439/535 |
| 7,097,516 B2 * | 8/2006 | Werner et al. ................. | 439/709 |
| 7,354,313 B2 * | 4/2008 | Kumazawa et al. .......... | 439/638 |
| 7,491,099 B2 * | 2/2009 | Zinell et al. .................... | 439/843 |
| 7,648,371 B2 * | 1/2010 | Boensch et al. ............. | 439/76.1 |
| 7,824,190 B2 * | 11/2010 | Beck et al. ................... | 439/76.1 |

* cited by examiner

*Primary Examiner* — Thanh Tam Le

(57) ABSTRACT

A solar module connector comprising: a cable; a housing having a mounting surface at least a portion of which partially defines an opening for facilitating contact with at least one buss lead of a solar module, a cavity, a cable end, and a passageway between the cavity and the cable end; a seal disposed around the cable and at least partially seated in the passageway; and a contact electrically connected to the cable and disposed in the cavity proximate the opening.

10 Claims, 7 Drawing Sheets

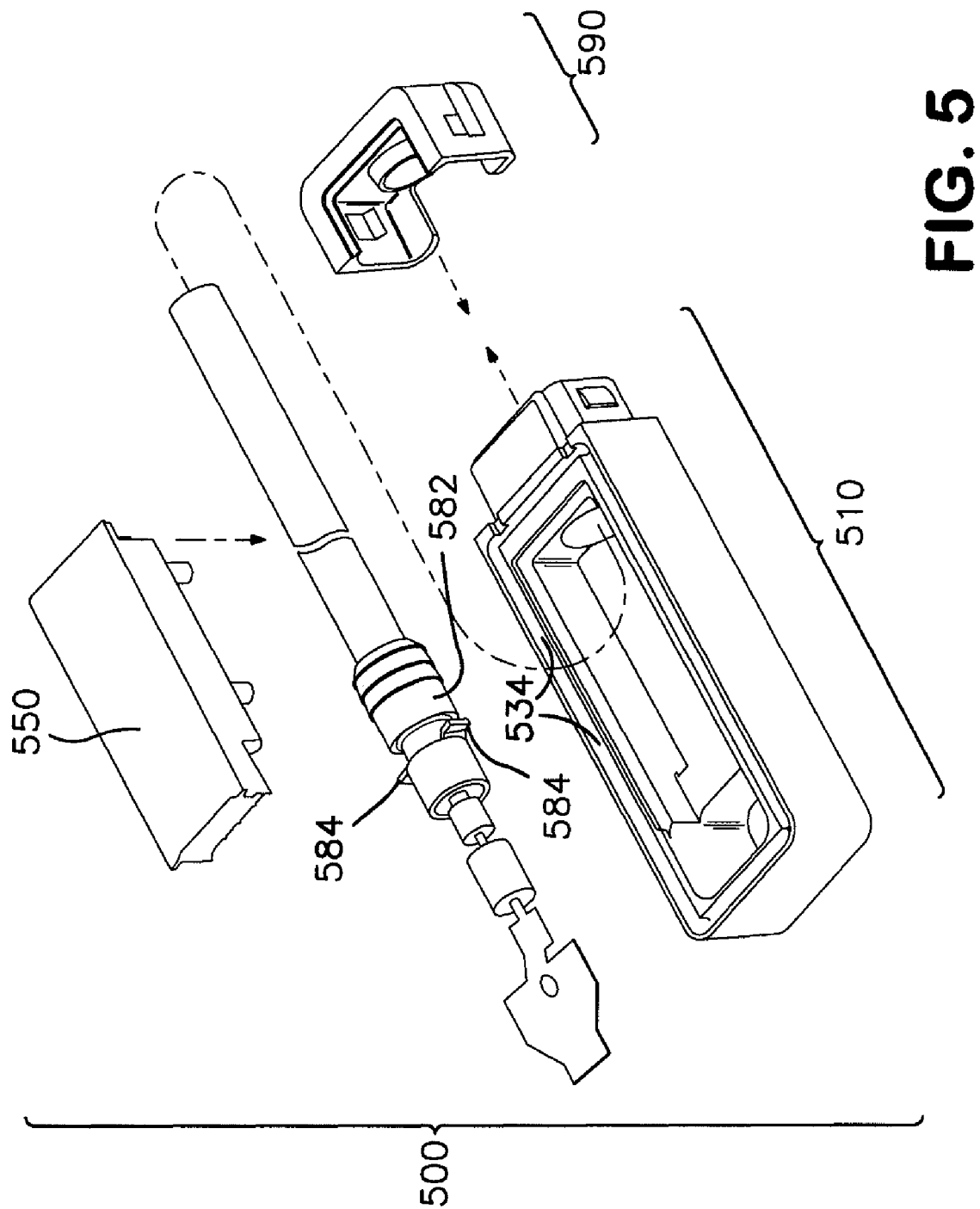

SOLAR MODULE CONNECTOR AND METHOD OF USE

FIELD OF INVENTION

The present invention relates to an electrical connector for connecting a solar module, and more specifically, to a sealed electrical connector for connecting leads extending from a solar module.

BACKGROUND OF INVENTION

Solar energy production provides significant environmental and economic benefits, including, for example, reduction in natural resource consumption, reduction in the disposal of waste by-products, and decreased sensitivity to variations in fuel commodity costs. Sunlight is converted into electricity within solar modules, which may be made from a semiconducting material, for example, silicon. When sunlight hits a solar module, the semiconductor absorbs the light, and electrons are "loosened" from the semiconductor atoms causing them to flow and to generate electricity. This conversion of sunlight to electricity is referred to as the "photovoltaic effect."

A solar module has buss leads to facilitate its electrical connection. For example, a typical solar module has thin foil buss leads extending from its lower surface (i.e., the side not exposed to the light source). Depending on the desired electric current/potential, the buss leads of individual solar modules may be connected in series. These buss leads are typically connectorized to facilitate their easy and reliable connection.

It has recently been recognized that existing connectors for connecting solar modules are susceptible to water infiltration. Without being bound by any theory, the inventors hypothesize that this defect is caused by use of thermally incompatible materials during manufacture. Specifically, a typical solar module connector is made typically by thermally fusing a connector housing onto a power cable by, for example, overmolding a molten thermoplastic resin around the cable jacket. During such an elevated temperature manufacturing process, if the resin or the cable jacket thermally degrades or there is chemical incombatability between materials, the resulting bond between the two components is poor thereby permitting water infiltration. The present invention provides a solution to this water infiltration problem, as well as other benefits.

SUMMARY OF INVENTION

The present invention provides a robust, readily-assembled solar module connector. Briefly, rather than overmolding a cable to the connector (a typical prior art approach as mentioned above), the connector of the present invention uses one or more interlocking or cooperating components to form a mechanical seal around the cable extending from the connector housing. Compared with existing solar module connectors, the component seal of the present invention provides enhanced protection against water infiltration, and thus better protects the connector's internal electrical components from the environment. Furthermore, the mechanical seal is achieved through compressive forces, thereby obviating the need for overmolding. As an additional benefit, because the seal between the housing and the cable may be formed using components having similar thermal expansion properties, the seal can withstand weather extremes by virtue of the components and cable expanding and contracting together through temperature changes. Additionally, the mechanical interconnection of the components tends to impart ruggedness to the connector, allowing it to handle relatively-high cable tensile loads and relatively-high impact forces. These beneficial features, among others, are provided by the solar module connectors described below.

Accordingly, one aspect of the invention is a solar module connector for connecting the buss leads of a solar module. In one embodiment, the connector comprises: (a) a cable; (b) a housing having a mounting surface at least a portion of which partially defines an opening for facilitating contact with at least one buss lead of a solar module, a cavity, a cable end, and a passageway between the cavity and the cable end; (c) a seal disposed around the cable and at least partially seated in the passageway; and (d) a contact electrically connected to the cable and disposed in the cavity proximate the opening.

Another aspect of the present invention is a kit having individual components for use in assembling a solar module connector. In one embodiment, the connector kit comprises (a) a housing having a mounting surface at least a portion of which defines an opening for facilitating contact with at least one buss lead of a solar module, a cavity, a cable end, and a passageway between the cavity and the cable end; (b) a seal configured for disposition around a cable and configured for seating in the passageway; and (c) a contact configured for electrically connecting to the cable and configured for disposition in the cavity proximate the opening.

Still another aspect of the invention is a method of assembling a solar module connector. In one embodiment, the method comprises: (a) providing a cable, a housing, a seal, a fastener, and a contact, wherein the housing has a mounting surface at least a portion of which defines an opening for facilitating contact with at least one buss lead of a solar module, a cavity, a cable end, a passageway between the cavity and the cable end; (b) inserting the cable through the passageway into the cavity until a length of the cable protrudes from the housing; (c) disposing the seal around the cable; (d) disposing the contact on the cable; and (e) retracting the cable from the housing until the seal is seated within the passageway and the contact is disposed in the cavity proximate the opening.

Additional features may be understood by referring to the accompanying drawings, which should be read in conjunction with the following detailed description.

BRIEF DESCRIPTION OF DRAWINGS

FIG. 4(*b*) is a bottom view of the solar module connector of FIG. 1.

FIG. 5 is a partially exploded view of a solar module connector in accordance with another exemplary embodiment hereof.

DETAILED DESCRIPTION

Figure 1:
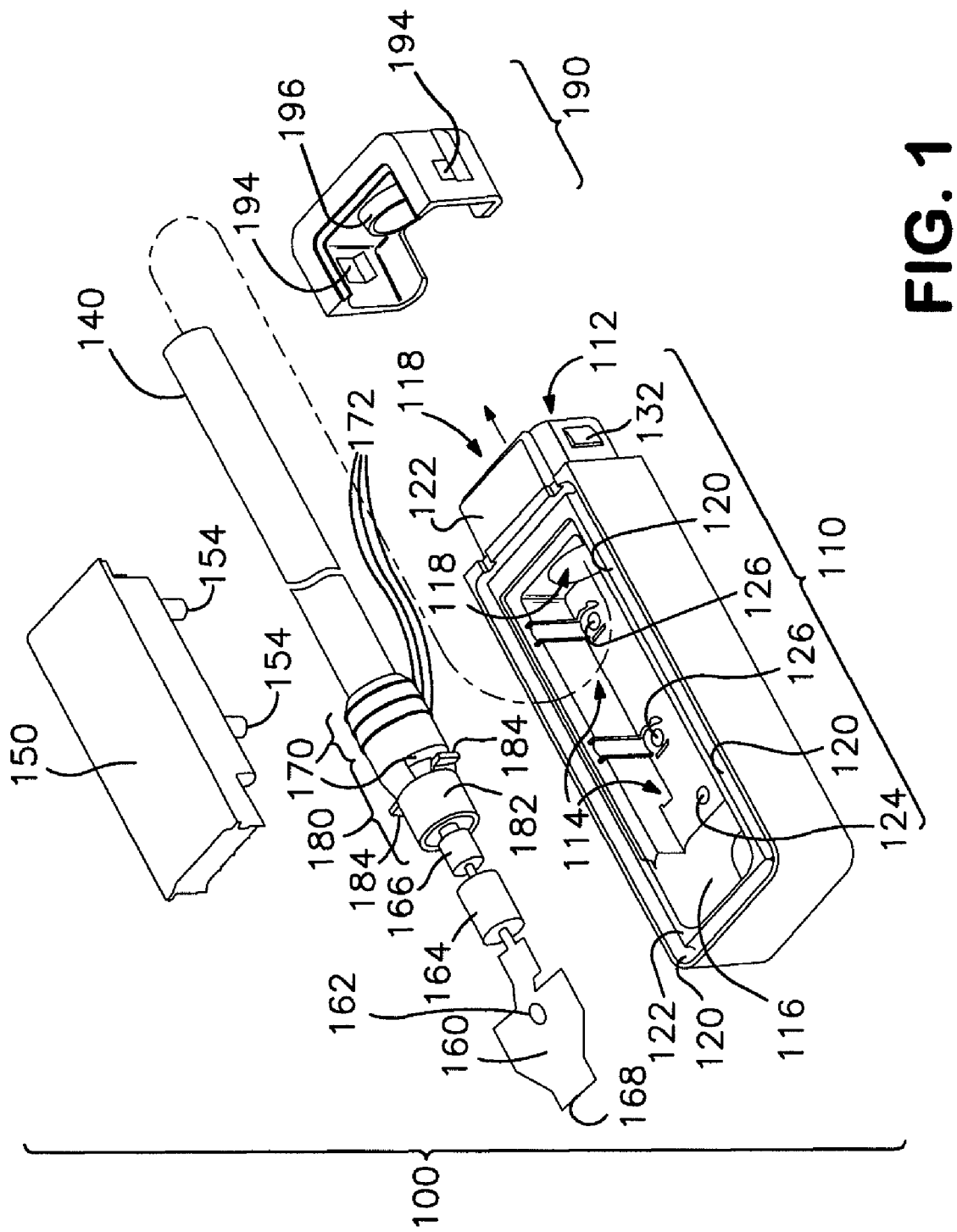
FIG. 1 is a partially exploded view of a solar module connector in accordance with an exemplary embodiment hereof.

Referring to FIGS. 1-4, one embodiment of a solar module connector 100 of the present invention is shown. The solar module connector 100 includes a cable 140. The solar module connector 100 also includes a housing 110 having a mounting surface 122 at least a portion of which partially defines an opening 116 for facilitating contact with at least one buss lead 72 of a solar module 71 (see FIG. 7), a cavity 114, a cable end 112, and a passageway 118 between the cavity 114 and the cable end 112. In this embodiment, the solar module connector 100 also includes a cover 150 mounted to the housing 110 over at least a portion of the cavity 114. The housing 110 and the cover 150 together cooperate to define the opening 116 (see FIG. 3). A seal 170 is disposed around the cable 140 and is at least partially seated in the passageway 118. Additionally, a contact 160 is electrically connected to the cable 140 and disposed in the cavity 114 proximate the opening 116. In this embodiment, a cable support bracket 190 is disposed on the cable end 112 of the housing 110, and has an annulus 196 against which the seal 170 abuts. Each one of these elements is discussed in greater detail below.

The housing 110 of the solar module connector 100 of the present invention functions to physically house and protects the internal components of the connector. Suitable housing embodiments have several common features. First, the housing has a mounting surface that mates with the solar module upon which the connector is mounted. For example, as illustrated in FIGS. 1-4, the housing 110 has the mounting surface 122, which, together with the cover 150 and the cable support bracket 190, defines a planar mating interface (see FIG. 3). Although the illustrated embodiment has a planar mating surface for mounting upon a flat solar module, it should be understood that the housing may have other geometric configurations to complement the features of non-planar solar modules.

Additionally, the housing has an internal space or cavity for receiving the internal components of the connector. For example, referring to FIG. 2, the housing 110 has a cavity 114 of sufficient size to accommodate the internal components, such as the contact 160, axial diode 164 and splice 166 disposed on the end of the cable 140 as shown.

The housing 110 also has an opening 116 for facilitating contact with at least one buss lead of a solar module. Thus, when mounted upon a solar module, the buss lead(s) of the solar module enter the connector housing through the opening. As illustrated in FIG. 3, the housing 110 and the cover 150 together define the opening 116, through which a buss lead of a solar module (not pictured) may be fed to meet the contact 160. Likewise, the housing also has a cable end 112 defining the passageway 118 between the cavity and exterior of the housing. The passageway 118 provides access for the cable 140 into the connector. Although the opening and the passageway 118 are located at essentially opposite ends in the embodiment of FIGS. 1-4, the position of these access points is variable.

In the embodiment shown in FIGS. 1-4, the housing also defines a reservoir 128 in which a free end 168 of the contact 160 is disposed (see FIG. 3). The reservoir 128 is configured to contain potting material to pot the lead and the contact once the connector is installed on the solar module (described below).

The housing may optionally define a groove on its mounting surface for receiving a bead of adhesive or sealant. In one embodiment, the groove circumscribes the opening, thereby effectively sealing the opening once the connector is installed on a solar module. For example, as illustrated in FIGS. 1-4, the housing 110 defines groove 120 upon its mounting surface 122, and the opening 116 is interior to the groove 120. (It should be understood that the connector 110 is pictured upside down relative to solar module in FIG. 1.) Because the opening 116 is circumscribed by the groove 120, it is effectively sealed by the sealant in the groove when the connector is mounted to the solar module. Additionally, in this embodiment, the cover 150 is also circumscribed with the groove. Accordingly, as with the opening 116, there is no need to seal the cover because of the perimeter of adhesive/sealant in groove 120 provides the necessary seal. Although this configuration is preferred from a simplicity standpoint since there is no need to separately seal the cover (indeed, the cover is no longer even necessary), it should be understood that alternative embodiments exist. For example, rather than circumscribing the opening and the cover with a perimeter of sealant, each feature may be individually sealed.

Although the cover is not necessarily needed to seal the housing (that function may be performed by a perimeter of sealant along the mating surface as mentioned above), the cover 150 may serve a number of different functions. First, as mention above, in the embodiment of FIGS. 1-4, it partially covers the cavity 114 and contains the components disposed therein. In one embodiment, the cover may also secure the components in place. For example, the cover 150 may comprise a post or similar structure that penetrates the contact and prevents its movement within the reservoir. Specifically, referring to FIG. 3, the contact 160 has a first aperture 162 (also see FIG. 1) configured for receiving a post 152 of the cover, and the housing 110 comprises a second aperture 124 for receiving the post 152. The post 152 extends through the first aperture 162 and into the second aperture 124 such that the contact 160 is essentially pinned to the housing 110. Alternatively, rather than a post on the cover pinning the contact to the housing, the contact may have a protrusion that is received by the cover or housing to hold the contact in place. Still other embodiments will be obvious to one of skill in the art in light of this disclosure.

Figure 2:
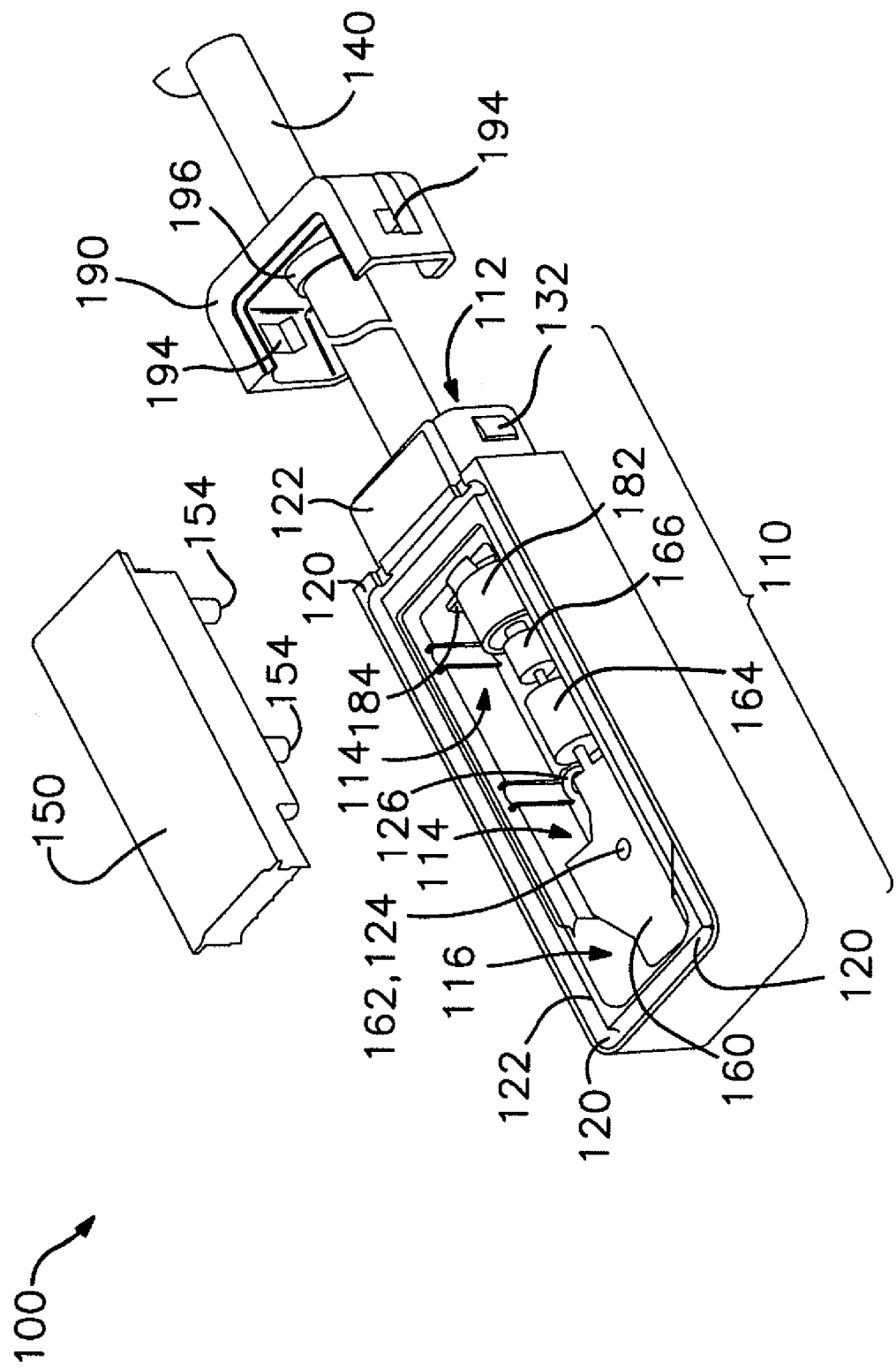
FIG. 2 is a bottom perspective view of the solar module connector of FIG. 1.
Figure 3:
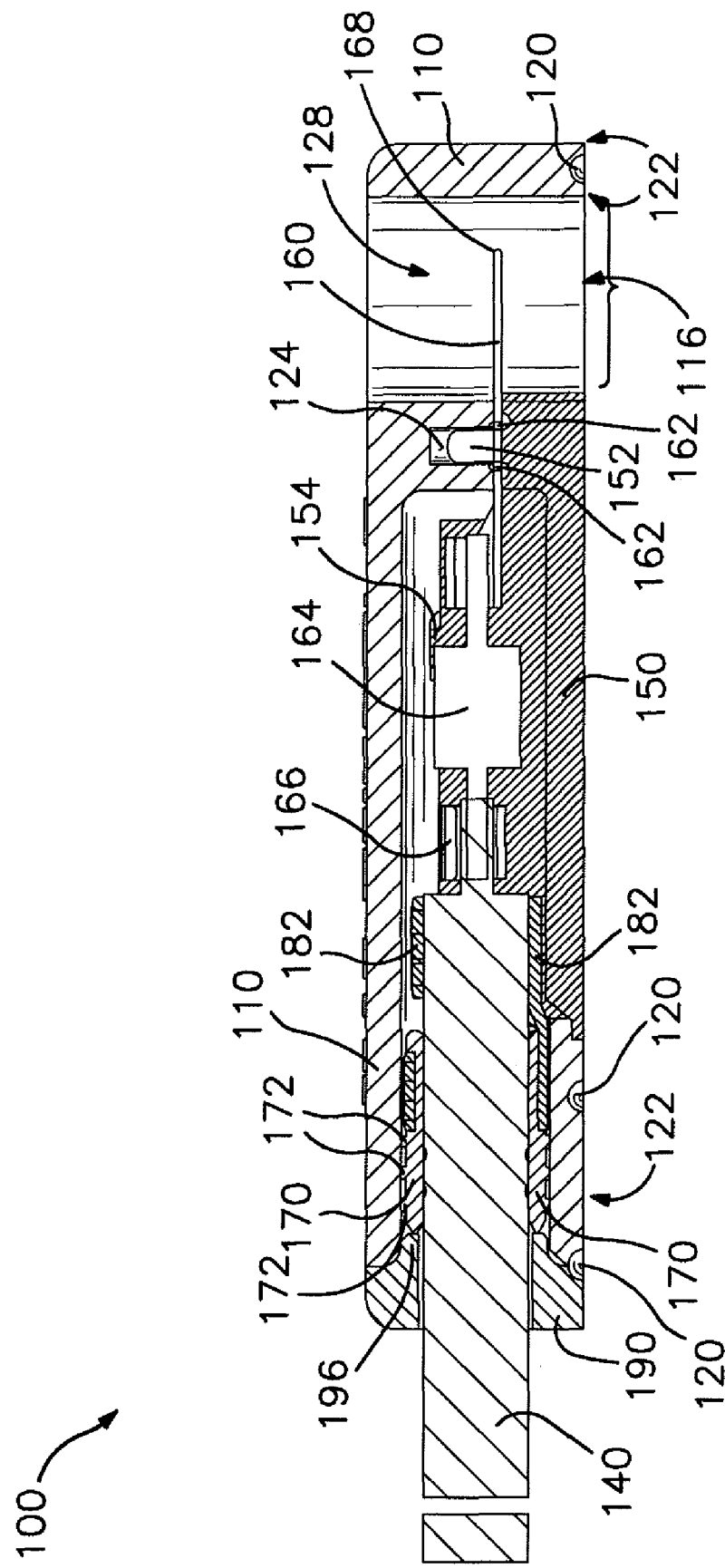
FIG. 3 is a side, cut-away view of the solar module connector of FIG. 1.

In the embodiment shown in FIGS. 1-3, the cover 150 also cooperates with the housing to define the reservoir 128 mentioned above. More specifically, referring to FIG. 3, the cover 150 interengages with the housing 110, sandwiching the contact 160 between it and the housing to essentially define a wall of the reservoir 128 through which the free end 168 of the contact 160 extends. Such a wall serves to contain the potting material as discussed below.

The cover 150 may be secured to the housing by a variety of means. For example, the cover may be fastened, adhered, or welded to the housing. Referring to FIG. 1, an embodiment is shown in which the cover is fastened to the housing interference fits between one or more pegs extending from the cover and corresponding holes in the housing. Specifically, the housing 110 has four holes (only the two rearward holes 126 are depicted) and the cover 150 has four pegs (only the two forward pegs 154 are depicted). The four pegs 154 are inserted into the four holes 126 to thereby secure the cover 150 to the housing 110. When a peg is inserted into a hole, the hole and/or peg deforms slightly to form an interference fit.

Referring to FIG. 5, a different embodiment is shown in which the cover is ultra-sonically welded to housing. Specifically, the connector 500 has a cover 550 that is configured to be received into a channel 534 upon a housing 510. After the cover 550 is placed into the channel 534, it is permanently attached thereto by ultrasonic welding, which is well know technique in the art.

The seal 170 functions to seal the space between the cable 140 and the passageway 118. To this end, the seal is a complaint member, which, when disposed about the cable and inserted in the passageway 118, conforms to the passageway and compresses about the cable 140 to form a weather-proof seal. Accordingly, the seal 170 should comprise a compliant, durable material. In one embodiment, the material of the seal has a coefficient of thermal expansion similar to the other materials used in forming the housing, cable jacket, and cable support bracket, such that the components expand and contract essentially together through temperature cycles. Suitable materials include, for example, rubber, silicone, silicone-rubber, thermoplastic vulcanizate. In the embodiment shown in FIGS. 1-4, the seal 170 comprises thermoplastic vulcanizate.

To improve its sealing action with the passageway 118, the seal 170 may comprise ribs or other known features for increasing compliance and/or contact with the passageway 118. For example, in the embodiment shown in FIGS. 1-3, the seal comprises ribs 172 (see FIG. 1).

An optional fastener 180 may be employed for securing the seal to the cable to prevent axial movement of the seal along a length of the cable. Although the configuration of the fastener may vary, in one embodiment, the fastener comprises a compression component for securing to the seal, and a strain relief component for transferring forces from the cable to the housing. For example, referring to FIG. 1, the fastener 180 has a compression ring 182 as the compression component, and two tabs 184 as the strain relief component. The ring 182 is crimped around the seal 170, thereby holding it in place relative to the cable. When the seal 170 is seated in the passageway 118, the tabs 184 abut (see FIG. 2) the portion of the housing defining the passageway 118. In such a configuration, the fastener transfers axial forces form the cable to housing, thereby preventing disengagement of the cable from the connector. It should be understood that alternative embodiments of the fastener are possible. For example, referring to FIG. 5, rather than having the compression and strain relief components integrated into a common fastener, their function may be performed by discrete components. Specifically, the compression component is compression ring 582 and the strain relief component is a discrete ring having tabs 584. Still other embodiments will be obvious in light of this disclosure.

To impart additional strength to the connector 100 against axial tensile loads applied to the cable, the connector 100 may also comprise a cable support bracket 190. The cable support bracket functions to provide a backstop to the seal 170. Referring to FIG. 3, in one embodiment, the cable support bracket 190 is disposed on the cable end of the housing 110, and has an annulus 196, which protrudes into the passageway, and against which the seal 170 abuts. In this configuration, the seal is prevented from moving backward. More specifically, if the cable is pulled, this force will be transferred from the cable, to the seal, and then to the cable support bracket, which is connected to the housing and, thus, ultimately transfers the force to the housing.

Different approaches may be used to secure the bracket 190 to the housing 110. In the embodiment shown in FIGS. 1-4, the cable support bracket 190 comprises one or more first engagement members 194 to interengage with second engagement members 132 on the cable end of the housing 110. In this embodiment, the first engagement members are notches in the cable support bracket 190 and the second engagement members are protrusions adapted to be received by the notches. It should be understood that the configuration of the first a second engagement members may be reversed or different engagement members such as latches, or an interference fit may be used instead.

Figure 4A:
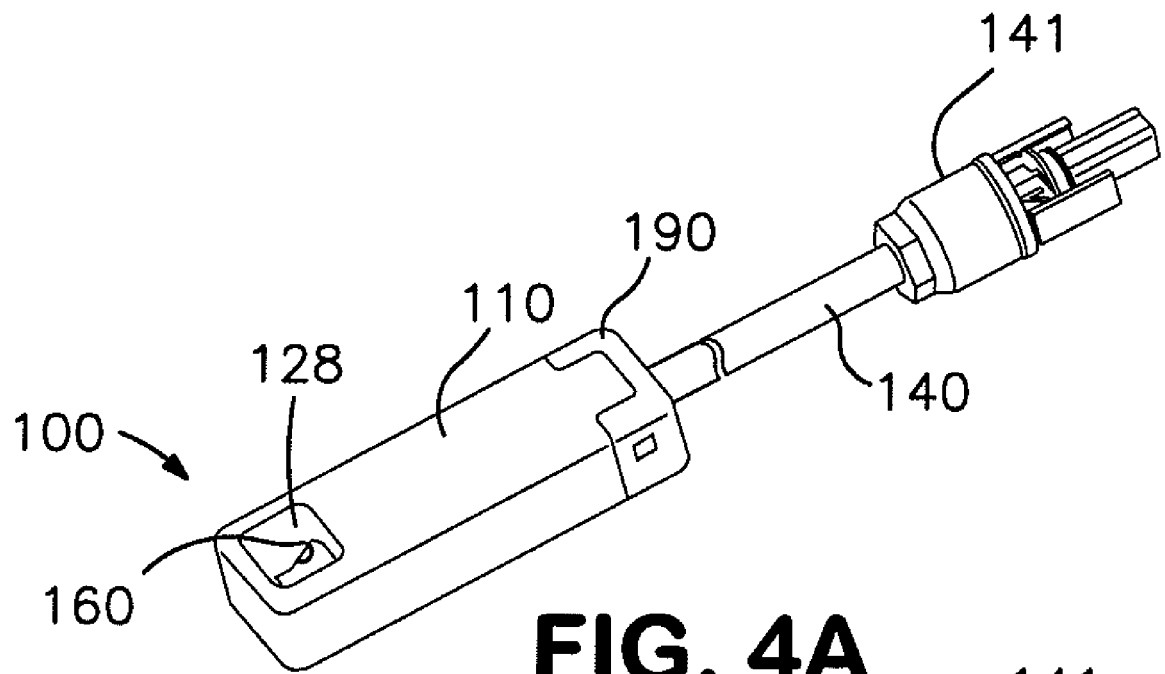
FIG. 4(*a*) is a top perspective view of the solar module connector of FIG. 1.
Figure 4B:
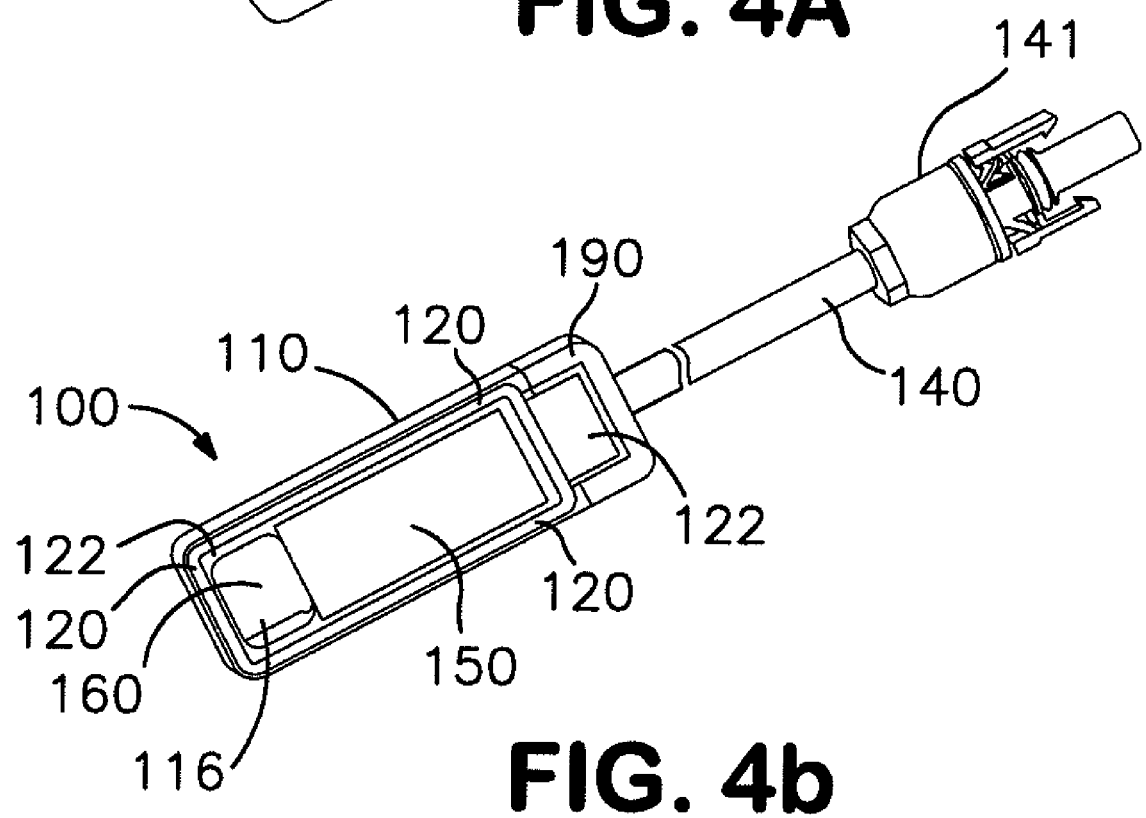

Referring to FIGS. 4(*a*)-4(*b*), the connector may also have an interface portion having one or more connection members 141 for connecting to similar connection members. Suitable interface portions are well known and commercially available. For example, the connection members 141 shown in FIG. 4(*a*) are SOLARLOK connectors commercially available through Tyco Electronics Corporation (Harrisburg, Pa.).

As shown in FIG. 1, the interface portion extends from the cable end of the housing. Although such a configuration is generally preferred, it should be understood that the interface portion may extend from any end of the housing and even from the surface opposite the mating surface.

In another embodiment, the connector is combined with a solar module. Specifically, the mounting surface 122 of the housing 110 is mounted upon the bottom surface of a solar module. (In some embodiments, it may be preferable to mount the connector on the upper—i.e., exposed—side of the solar module.) As mentioned above, to seal the opening and effect mounting of the housing to the solar module, a bead of sealant is applied to the groove 120 along the perimeter of the mounting surface of the housing. The solar module comprises at least one buss lead, an end of which is disposed in the opening of the housing, and which is electrically coupled to the contact. In one embodiment, the interconnection of the lead and contact is potted to secure and protect this interconnection.

In still another embodiment, the invention provides a connector kit comprising individual components of a solar module connector as described herein. A connector kit of the present invention is particularly useful for field assembly because no adhesives are used in the component assembly of the connector.

Figure 6:
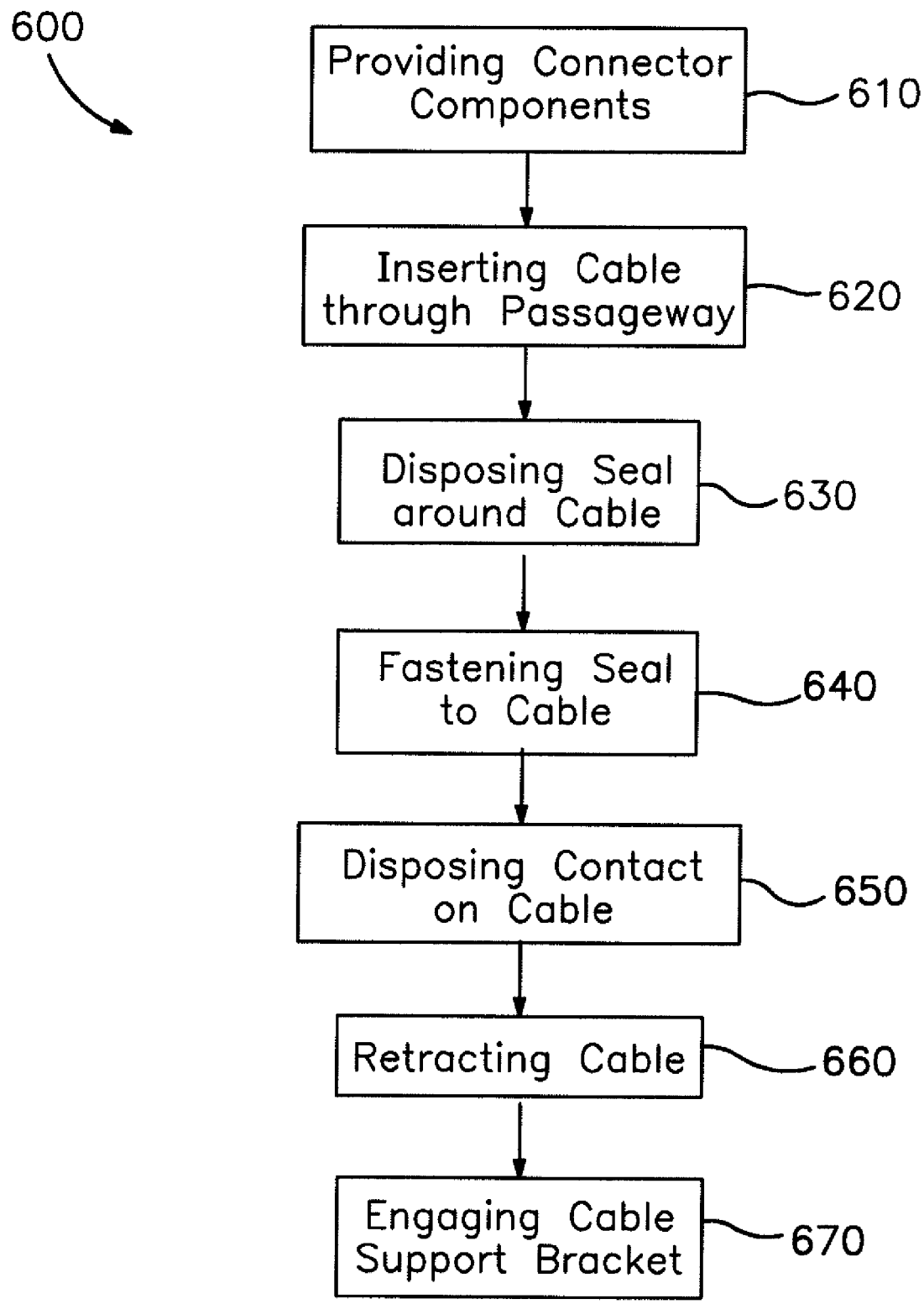
FIG. 6 schematically illustrates the steps of a method of assembling a solar module connector.

The connector of the present invention also facilitates a simple and reliable method of assembly. Referring to the flowchart in FIG. 6, the invention includes a method 600 of assembling a solar module connector. The method 600 comprises providing the components of a solar module connector in step 610, namely, a cable, a housing, a seal, a fastener, a contact, and a cable support bracket as described above. In step 620, the cable is inserted through the passageway into the cavity until a length of cable protrudes from the housing. If a cable support bracket is being used, it may be necessary to insert the cable through it before inserting it through the passageway of the housing. The length of cable should be sufficient to accept the seal, which is disposed around the cable in step 630. Next, the seal is secured to the cable with a fastener in step 640. A contact is then disposed on the cable, which the insulation has been stripped exposing the internal wire conductor, in step 650. At this time, it may be desirable to add a axial diode or other known electrical components to the terminated end of the cable. For example, as illustrated in FIG. 1, the cable 140 is electrically coupled to an optional axial diode 164, which prevents current back-flow by a splice 166.

Figure 7:
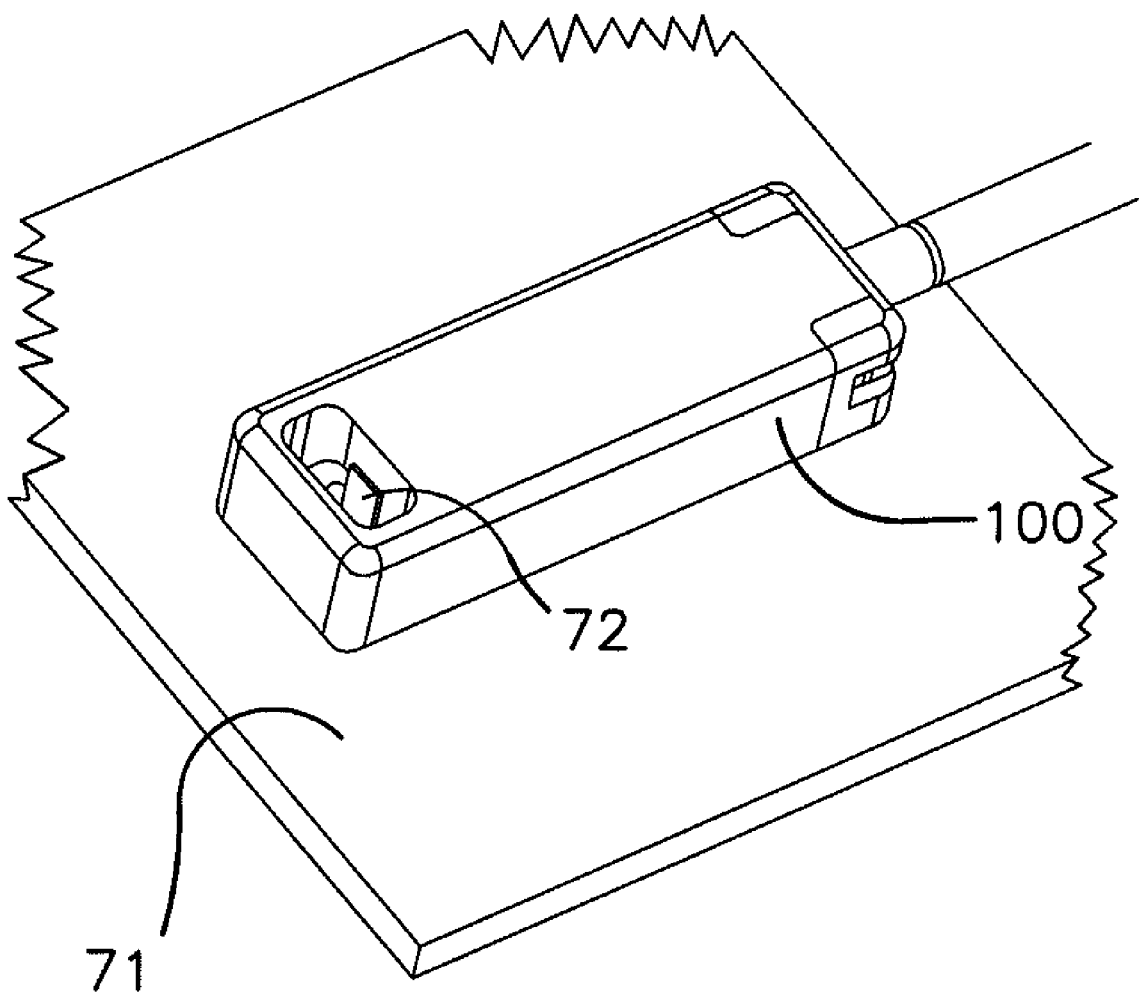
FIG. 7 is a perspective view of the solar module connector of FIG. 1 on a solar module.

Next, the cable is retracted through the passageway in step 660, which serves to seat the seal snugly into the passageway. If the fastener has tabs, the cable should be withdrawn through the passageway so that the tabs abut the housing around the passageway. Once the cable is fully withdrawn and the seal seated, the contact should be disposed in the cavity proximate the opening, thereby facilitating its connection to the buss lead of a solar module. To hold the components in place, it may be desirable at this time to connect the cover, which, in one embodiment, comprises structure members that pin and hold the components (e.g., the contact) in place. In step 670, if the optional cable support bracket is being used, it is engaged with the housing such that the annulus of the cable support bracket protrudes into the passageway and abuts said seal. At this point, the component assembly of the connector is complete, and it is ready for mounting to a solar module 71 as shown in FIG. 7.

The connector may be mounted to the solar module using various known means, although adhering it to the surface of the module is generally preferred from a simplicity standpoint. To this end, adhesive is applied along the groove as mentioned above. The connector is then positioned relative to the solar module such that the module's buss lead extends through the opening of the connector. At this point, the mounting surface of the connector (with the adhesive applied thereto) is pushed against the solar module to both adhere the connector to the module and to seal the opening (and the cover as mentioned above) from the environment. The buss lead 72 (see FIG. 7) at this point may be soldered or otherwise affixed to the contact. Finally, to protect and secure the interconnection of the contact and buss lead, the reservoir in which the interconnection of the contact and buss lead is disposed may be potted using known methods.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

The invention claimed is:

1. A solar module connector comprising:
   a cable;
   a housing having a mounting surface, a cavity, a cable end, and a passageway between said cavity and said cable end, at least a portion of said mounting surface partially defining an opening for facilitating contact with at least one buss lead of a solar module;
   a seal disposed around said cable and at least partially seated in said passageway;
   a contact electrically connected to said cable and disposed in said cavity proximate said opening;
   a cover mounted to said housing over at least a portion of said cavity and cooperating with said housing to define said opening; and
   wherein said cover comprises a post, said contact comprises a first aperture configured for receiving said post, and said housing comprises a second aperture for receiving said post, said post extending through said first aperture and into said second aperture such that said contact is held within said housing.

2. A solar module connector comprising:
   a cable;
   a housing having a mounting surface, a cavity, a cable end, and a passageway between said cavity and said cable end, at least a portion of said mounting surface partially defines an opening for facilitating contact with at least one buss lead of a solar module;
   a seal disposed around said cable and at least partially seated in said passageway;
   a contact electrically connected to said cable and disposed in said cavity proximate said opening;
   a cover mounted to said housing over at least a portion of said cavity and cooperating with said housing to define said opening; and
   wherein said cover and said housing cooperate to define a reservoir proximate said opening and containing a free end of said contact, wherein said reservoir contains a potting material.

3. A solar module connector comprising:
   a cable;
   a housing having a mounting surface, a cavity, a cable end, and a passageway between said cavity and said cable end, at least a portion of said mounting surface partially defining an opening for facilitating contact with at least one buss lead of a solar module;
   a seal disposed around said cable and at least partially seated in said passageway;
   a contact electrically connected to said cable and disposed in said cavity proximate said opening;
   a cover mounted to said housing over at least a portion of said cavity and cooperating with said housing to define said opening; and
   wherein said housing defines a groove on said mounting surface and wherein said cover is interior to said groove.

4. A solar module connector comprising:
   a cable;
   a housing having a mounting surface, a cavity, a cable end, and a passageway between said cavity and said cable end, at least a portion of said mounting surface partially defining an opening for facilitating contact with at least one buss lead of a solar module; said housing defining a groove on said mounting surface and wherein said opening is interior to said groove;
   a seal disposed around said cable and at least partially seated in said passageway; and
   a contact electrically connected to said cable and disposed in said cavity proximate said opening.

5. The solar module connector according to claim 4, further comprising a fastener for securing said seal to said cable to prevent axial movement of said seal thereon.

6. The solar module connector according to claim 5, wherein said fastener comprises at least one tab bent outwardly to contact said housing and prevent axial movement of said cable in at least one direction in said passageway.

7. The solar module connector according to claim 4, further comprising:
   a cable support bracket disposed on said cable end of said housing and abutting said seal.

8. The solar module connector according to claim 7, wherein said cable support bracket comprises an annulus against which said seal abuts.

9. The solar module connector according to claim 4, further comprising said solar module to which said mounting surface of said housing is mounted, said solar module having said at least one buss lead to which said contact is electrically connected.

10. A connector kit comprising:
    a housing having a mounting surface, a cavity, a cable end, and a passageway between said cavity and said cable end, at least a portion of said mounting surface defining an opening for facilitating contact with at least one buss lead of a solar module;
    a cover configured for mounting to said housing over at least a portion of said cavity and cooperating with said housing to define said opening;
    a seal configured for disposition around a cable and configured for seating in said passageway;
    a contact configured for electrically connecting to said cable and configured for disposition in said cavity proximate said opening; and
    a cable support bracket configured for disposition on said cable end of said housing, said cable support bracket having an annulus configured for protruding into said passageway and for abutting said seal.

* * * * *